June 18, 1946.  J. W. SUYDAM  2,402,214
ELECTRIC MOTOR
Filed Feb. 7, 1945

Inventor
Joseph W. Suydam

By Edwin Guthrie,
Attorney

Patented June 18, 1946

2,402,214

UNITED STATES PATENT OFFICE 2,402,214

ELECTRIC MOTOR

Joseph W. Suydam, Blue Point, N. Y.

Application February 7, 1945, Serial No. 576,520

1 Claim. (Cl. 172—36)

This invention relates to electric motor construction of special character. The purpose of this invention is to provide a motor having an armature and magnetic circuit composed of laminations of metal, suitably insulated when necessary, and to produce a means for obtaining an integral connection between the electrical inductors or conductors and the commutator of the motor.

Since the electrical conductors and the commutator are in the practice of this invention stamped out of sheet metal in such a manner that a complete conductor and segment are formed from each individual stamping, no joints between the conductors or inductors and segments thereof are required. Reduced manufacturing costs and a generally superior method of connecting the electrical conductors together and to the commutator segments are believed practicable with this invention and type of particular construction. Further advantages result from making the commutator of relatively thin sheet metal segments because the commutator diameter may thus be kept at a minimum for any number of segments, thus saving weight and material and minimizing the commutation difficulties often experienced at high armature rotative speeds.

This invention is especially adapted to high speed starting and actuating motors for aircraft use, although its application may be extended to any nature of service where high speed, light weight electric motors are employed.

The special construction and disposition of the parts of this invention is illustrated in the drawing accompanying and constituting a part of this application.

Throughout the drawing and description the same number is used to refer to the same part.

Figure 1:
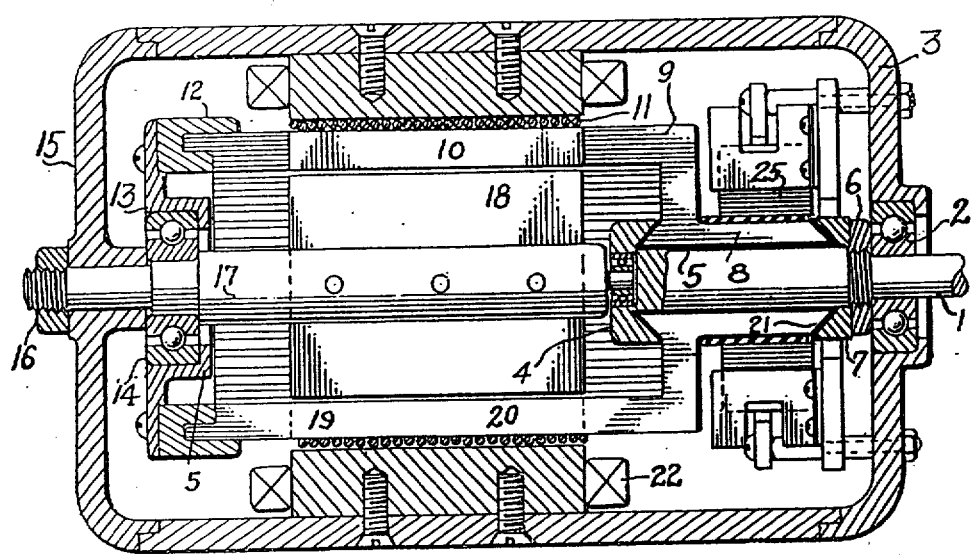
Fig. 1 represents a longitudinal vertical sectional view of an electric motor embodying the special features of this invention.

The armature is carried by the bearings 2 and 14. The bearing 2 is pressed into the end bell 3 of the casing and onto the rotary shaft 1. Bearing 14 is pressed into the retainer 13 and carried on the stationary shaft 17 which is secured to the bell 15 of the casing by the nut 16. Retainer 13 is secured to the revoluble connecting ring 12 by screws or any other suitable means.

The laminated electric conductors or inductors 9 are usually stamped from sheet copper, and are formed with L-shaped end portions which serve as the commutator segments 8 which are secured to and insulated from shaft 1 by insulation 5, and held by the cones 4 and 7 and the nut 6. The other ends of the laminated conductors 9 are secured usually by soldering to the connecting ring 12.

Interposed between the electrical conductor laminations are the magnetic plates 10, usually sheared from sheet steel.

Figure 2:
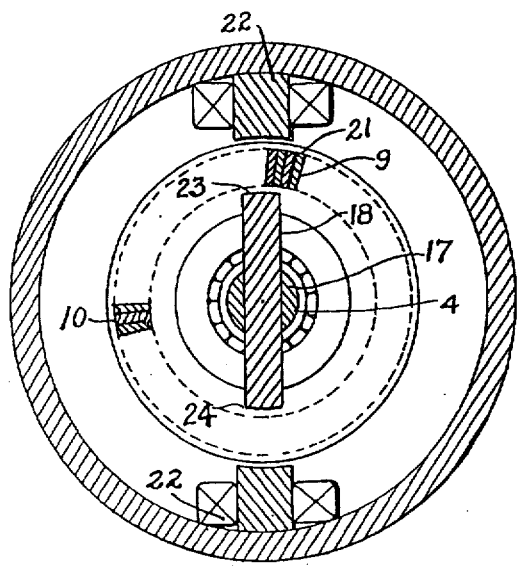
Fig. 2 is a cross section taken vertically about midway of the structure set out in Fig. 1.

It will be noted in Fig. 2 that the magnetic vane 18 passes through diametrically and is secured in the stationary shaft 17. It will be likewise noted in Fig. 1 that the magnetic plates 10 extend to points marked 19 and 20 adjacent to the ends 23 and 24 of the magnetic vane 18, also shown in Fig. 2.

No limitation is intended on the number or combinations of the electrical conductors 9 and the magnetic interposed plates 10, it being considered within the scope of this invention to extend the laminations to the full armature length or to any part thereof in any desired combination of the parts used.

In Fig. 2 there is shown the filling of insulating material 21 which is employed to hold the laminations in positions and to insulate them from each other and from the revoluble shaft 1 and the cones 4 and 7. In manufacturing this armature it may be advantageous to use a Bakelite or other plastic compound which will adequately bond the laminations together.

The banding wire 11 is sometimes employed to protect the armature from undue expansion at high rotative speeds. Another method of protection against over expansion is to adherently place a thin metal tube around the armature laminations. Peripheral slots may be cut into or through the tube to avoid eddy current losses therein. Brushes 25 deliver the current needed.

The necessary field magnets 22 are carried by the motor casing, and are presented adjacent to the outer edges of vane 18, having reference numbers 23 and 24 in Fig. 2, in order to continue strongly the magnet force of the field magnets. No limitation is intended as to the method of energizing the interior and exterior magnetic poles, it is held within the purview of this invention to employ either permanent magnetism or the use of field windings on any or all parts.

The operation of this motor is the same as that of any electric motor, the invention herein comprising the construction and arrangement of the parts described in this specification, and having set forth the special structure.

I claim:

In an electric motor construction, a casing, a revoluble shaft provided with a bearing carried by the casing, an aligned stationary shaft, a bearing on the stationary shaft, a revoluble ring borne by the said bearing on the stationary shaft, a plurality of sheet metal inductors arranged flatwise together forming a hollow cylinder, plates of magnetic material located between said inductors, the said inductors and interposed plates being separated from each other by insulating material, each of said inductors having one end secured to said revoluble ring, each of said inductors having an L-shaped end portion constructed and arranged to form the commutator of the motor and insulated from said revoluble shaft, brushes fashioned and disposed to deliver current to the commutator formed by the end portions of said inductors, and field magnets carried by the casing and arranged to extend into proximity with the said inductors and a diametric vane of magnetic metal carried by said stationary shaft and arranged to receive magnetism from said field magnets.

JOSEPH W. SUYDAM.